(Model.)

W. L. DEWART, Jr.
Balanced Valve.

No. 242,437.                        Patented June 7, 1881.

Attest:
R. F. Barnes.
Frank L. Middleton

Inventor:
William L. Dewart Jr.

UNITED STATES PATENT OFFICE.

WILLIAM L. DEWART, JR., OF WASHINGTON, DISTRICT OF COLUMBIA.

BALANCED VALVE.

SPECIFICATION forming part of Letters Patent No. 242,437, dated June 7, 1881.

Application filed November 29, 1880. (Model.)

*To all whom it may concern:*

Be it known that I, WILLIAM LEWIS DEWART, Jr., a citizen of the United States, residing in Washington, in the District of Columbia, have invented a new and useful Improvement in Balanced Valves for Steam-Engines, of which the following is a specification.

My invention relates to that class of devices commonly denominated "balance slide-valves for steam-engines," the object of which being to lessen pressure of the valve upon the valve-seat, and consequently to diminish friction incident thereto when the valve is in motion.

It also relates to the construction of the valve and balance plate, so that it will compensate for any inequality of surface between the steam-chest and valve-seat. I accomplish this object by the mechanism illustrated in the accompanying drawings, in which—

Figure 1:
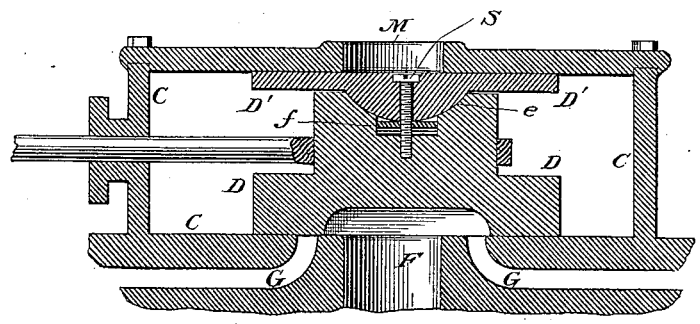
Figure 2:
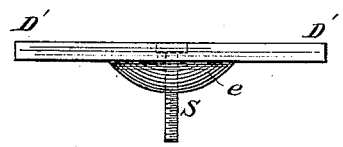
Figure 3:
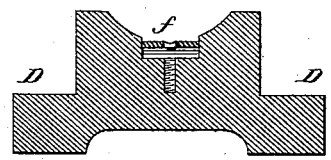

Figure 1 is a vertical section of valve and steam-chest; Fig. 2, vertical section of upper portion of valve detached; Fig. 3, detached vertical section of lower portion or part of valve.

In Fig. 1 C C is a sectional outline of steam-chest of usual form.

D D and D' D' constitute the body of the valve, the two parts being fastened together and adjustable by means of the screw S, which is countersunk in the upper face of D' D', as shown.

The upper section or part of the valve, Fig. 2, is provided with the convex projection e, which, when in position, fits into a corresponding concave socket in the lower section, D D, thus forming a ball-and-socket joint. Within the socket is the spring f, upon which rests the convex projection when the two sections are adjusted together by means of the screw S.

The steam-ports G G and the exhaust F, being of the usual form and in the usual relative position, need not be more fully described.

Through the upper side of the chest, and in a position opposite to the exhaust, is the aperture M. The steam in the chest is prevented from passing through the aperture M by means of the upper section of the valve, which is provided with a smooth surface or face that bears tightly against the upper interior surface of the chest, said section being broader than the aperture, and so long that the aperture is not uncovered when the valve is operated. The size of this aperture should be the same, or about the same, as that of the exhaust-passage F, and should open to free air, or to the same channel as F.

The function of the ball-and-socket joint is to allow the valve and plate to adjust themselves to any inequality in the surface of the steam-chest and valve-seat, against which they impinge.

The practical operation of the mechanism is as follows: Supposing the chest to be filled with steam, there will be, in whatever position the valve is placed, a downward pressure toward the exhaust-passage corresponding with the size of that passage. In valves as ordinarily constructed this pressure produces friction on the valve-seat; but in my device, above shown, this downward pressure toward the exhaust is counterbalanced by the upper pressure toward the aperture M, and the friction on the valve-seat incident to such downward pressure is avoided.

Having now fully described my invention, what I claim, and desire to secure by Letters Patent, is—

1. A balanced slide-valve for steam-engines wherein a superimposed balance-plate is connected with the body of the valve by means of a ball-and-socket joint, the plate and valve so constructed that they compensate for any inequality of surface between the steam-chest and valve-seat, substantially as and for the purpose set forth.

2. The combination, in a balanced slide-valve for steam-engines wherein the balance-plate D' D' and valve proper, D D, are connected with each other by means of a ball-and-socket joint, of an adjusting-screw passing through said ball and into said valve, substantially as and for the purpose set forth.

3. In a balanced slide-valve for steam-engines wherein the balance-plate is connected with the valve proper by means of a ball-and-socket joint, the combination of spring f and adjusting-screw S, substantially as and for the purpose set forth.

WILLIAM L. DEWART, JR.

Witnesses:
S. M. BROWN,
H. M. MISSIMER.